United States Patent [19]

Ishibashi

[11] Patent Number: 5,132,948
[45] Date of Patent: Jul. 21, 1992

[54] PHASE COMPARING APPARATUS AND FOCUS ERROR DETECTING APPARATUS

[75] Inventor: Hiromichi Ishibashi, Toyonaka, Japan

[73] Assignee: Matsushita Electric Industrial Co., Ltd., Osaka, Japan

[21] Appl. No.: 749,602

[22] Filed: Aug. 26, 1991

[30] Foreign Application Priority Data

Aug. 27, 1990 [JP] Japan ................. 2-225806

[51] Int. Cl.$^5$ ................. G11B 7/09
[52] U.S. Cl. ................. 369/44.34; 369/44.25; 369/44.32; 369/44.41; 369/54; 318/608; 318/640; 250/201.5
[58] Field of Search ............... 369/44.34, 44.25, 44.32, 369/44.41, 54, 58, 32, 44.26, 109, 44.36, 44.35, 44.42, 43; 318/577, 608, 606, 638, 639, 640, 683; 250/201.1, 201.2, 201.3, 201.4, 201.5, 201.6, 201.7, 201.8, 201.9

[56] References Cited

U.S. PATENT DOCUMENTS 4,589,103  5/1986  Tajima ................. 369/44.34
4,710,909  12/1987  Tsuyoshi et al. ......... 369/44.26
4,998,235  3/1991  Ishibashi et al. ......... 369/44.36

*Primary Examiner*—Roy N. Envall, Jr.
*Assistant Examiner*—Muhammad N. Edun
*Attorney, Agent, or Firm*—Wenderoth, Lind & Ponack

[57] ABSTRACT

A phase comparing apparatus which outputs a signal of an amplitude corresponding to phase difference between a first and second signals, includes a difference signal operating device for outputting a difference signal generated according to the difference in voltage between the first and second signals, first and second maximum value detecting device for respectively generating first and second maximum value detecting signals when maximum values of the first and second signals are respectively detected, a timing comparing device for outputting a first timing signal in response to one of the first and second maximum value detecting signals which is generated earlier than the other thereof and outputting a second timing signal in response to the other thereof, first and second sample-and-hold devices for respectively sampling and holding the difference signal outputted from the difference signal operating means, in response to the first and second timing signals, respectively, and a differential device for outputting a difference signal generated according to difference in voltage between signals outputted from the first and second sample-and-hold devices. A focus error detecting apparatus includes a light beam emitting device, an objective lens for condensing light beams emitted by the light beam emitting device on a recording medium, and a light receiving device, having two sections outputting the first and second signals, for detecting light beams which has been reflected by the recording medium and converting the light beams into signals, and the phase comparing apparatus.

2 Claims, 4 Drawing Sheets

PHASE COMPARING APPARATUS AND FOCUS ERROR DETECTING APPARATUS

BACKGROUND OF THE INVENTION

1. Field of the Invention

The present invention relates to a focus error detecting apparatus in which a multi-divided light receiving element detects a far field image reflected by a pit preformed on the recording surface of an optical disk so as to detect a focus error signal by comparing the output of each divided section and a phase comparing apparatus for executing the result obtained by the focus error detecting apparatus.

2. Description of the Related Arts

In recent years, much attention is paid to a focus error detecting apparatus which without using a special optical element, detects a focus error signal based on a far field pattern formed by a laser beam reflected by an optical disk. Various improved techniques have been developed since the technique concerning the focus error detecting apparatus was disclosed in Japanese Laid-Open Patent Publication No. 52-93223. Above all, inventions intended to improve S/N and expand the dynamic range in detecting a focus error have been conspicuously made.

An example of a conventional focus error detecting apparatus is described below with reference to FIG. 5.

FIG. 5 is a block diagram showing a conventional focus error detecting apparatus. The apparatus comprises a light source 20 for emitting laser beams, an optical disk 30, an objective lens 40, a light receiving element 50, buffer amplifiers 70 and 80, pulse generators 90 and 100, sample holding circuits 110 and 120, and a differential amplifier 130. There is recorded information as optically readable pits, i.e. information pits preformed on the recording surface of the optical disk 30 which is rotating. The light receiving element 50 has semicircular light receiving sections 50a and 50b. Lights which have diffracted and scattered at the information pit of the optical disk 30 are incident on the light receiving sections 50a and 50b. Upon receipt of signals outputted from the light receiving sections 50a and 50b, the buffer amplifiers 70 and 80 amplify them up to a predetermined level, thus outputting signals Sa and Sb, respectively. The pulse generators 90 and 100 generates pulse signals Pa and Pb when the signals Sa and Sb cross an appropriate threshold (Vth). The sample-and-hold circuits 110 and 120 sample and hold the signals Sa and Sb at the leading edges of the pulse signals Pa and Pb, respectively, thus outputting signals FE+ and FE−. The differential amplifier 130 generates a focus error signal FE based on the difference in voltage between the signals FE+ and FE−. This construction is disclosed in, for example, Japanese Laid-Open Patent Publication No. 60-243828.

The operation of the focus error detecting apparatus of the above construction is described below. Supposing that the optical disk 30 is rotating at a constant speed, when the image forming point of laser beams condensed by the objective lens 40 coincides with the information pit recorded on the optical disk 30, namely, at the focal point, the far field pattern of the information pit projected on the light receiving element 50 is approximately uniformly dark. Therefore, at this time, the signals Sa and Sb outputted from each of the light receiving sections 50a and 50b have almost the same phase. When the information pit does not coincide with points other than the focal point of laser beams, i.e., out of the focal point, the far field pattern of the information pit changes like a solar eclipse, i.e., dark portions cross the dividing line of the light receiving element 50. Accordingly, at this time, the signals Sa and Sb have a phase lag or a phase lead. The principle of this phenomenon is omitted herein because it is described in Japanese Laid-Open Patent Publication No. 52-93223. A focus error can be detected by accurately detecting the phase difference.

Referring to FIG. 5, pulse signals Pa and Pb are generated such that the pulse signals Pa and Pb rise when the voltages of the signals Sa and Sb exceed the threshold Vth and fall when the voltages of the signals Sa and Sb become equal to or smaller than those of the threshold Vth. The sample-and-hold circuit 110 samples and holds the signal Sa at the rise of the pulse signal Pb, and the sample-and-hold circuit 120 samples and holds the signal Sb at the rise of the pulse signal Pa. Since the signals Sa and Sb have the same phase at the focal point, the sampled and held signals FE+ and FE− have the same value, namely, the threshold Vth. Accordingly, the value of the difference signal FE between the signals FE+ and FE− is zero. Out of the focal point, i.e., when the phases of the signals Sa and Sb are different from each other, FE+ > Vth and FE− < Vth, or FE+ < Vth and FE− > Vth. That is, the difference signal FE is positive or negative. Accordingly, the phase difference between the signals Sa and Sb can be detected as a voltage. The differential amplifier 130 generates a focus error signal based on the voltage.

The above operation is expressed by equations as follows: For simplification, Sa and Sb are expressed as follows:

$$Sa = A \sin(\omega t + \phi/2) \tag{1}$$

$$Sb = A \sin(\omega t - \phi/2) \tag{2}$$

Supposing that the pulse signals Pa and Pb rise when the signals Sa and Sb change each from a negative value to a positive value (namely, Vt=0), the timing $t_a$ and $t_b$ of each of the pulse signals Pa and Pb is expressed as follows:

$$t_a = (2n\pi - \phi/2)/\omega \tag{3}$$

$$t_b = (2n\pi + \phi/2)/\omega \tag{4}$$

Substituting equation (4) for equation (1) and equation (3) for equation (2):

$$FE^+ = A \sin(2n\pi + \phi) \tag{5}$$

$$FE^- = A \sin(2n\pi - \phi) \tag{6}$$

Accordingly, the focus error signal FE is shown as follows:

$$FE = FE^+ - FE^- = 2A \sin(\phi) \tag{7}$$

Thus, it is possible to detect a focus error in the range from −90° to +90°. The focus error signal expressed in equation (7) is shown in FIG. 6.

This art is superior to that disclosed in Japanese Laid-Open Patent Publication No. 52-93223 in that in the latter, the phase difference between the output signals Sa and Sb of each light receiving section is found by the product of a difference signal (Sa−Sb) and a sum signal (Sa+Sb), the phase of which is delayed by 90° while in the former, the phase difference is found by comparing the phases of the signals Sa and Sb with each other. That is, out of the focal point, not only a phase difference is generated between the outputs of the light receiving sections, but also the amplitude of the output of each light receiving section is reduced. That is, "A" of equations (1) through (7) is not a constant but a function of defocus. Moreover, at the time of a defocus, i.e. out of the focal point, the degree of the output reduction of the sum signal (Sa+Sb) is greater than that of the signal Sa or the signal Sb. This is briefly described below. The sum signal is expressed as follows from equations (1) and (2):

$$Sa + Sb = 2A \cos(\phi/2) \sin(\omega t)$$

That is, the amplitude of the sum signal is the product of the reduced amount of (A) and $\cos(\phi/2)$. For example, when $\phi = 90°$ which is the upper limit of the focus error detection, the amplitude of the sum signal is shown as follows:

$$2A \cos(45°) = 1.4A$$

As shown above, considering the ratio, the amplitude is reduced by 30% compared with that of each signal before it is added to each other. The reduction of the amplitude of the signal in proportion to a focus error amount means the reduction of a focus error detection sensitivity, which substantially means the reduction of the dynamic range of the focus error detection. Therefore, according to the technique disclosed in Japanese Laid-Open Patent Publication No. 60-243828, the dynamic range in focus error detection is widened to some extent as described above.

However, according to the above construction, a phase difference is detected as small as $-90°$ to $+90°$, which is not a sufficient dynamic range to detect a focus error. The normal dynamic range required for a focus error detection system of driving an optical disk is approximately $\pm 5$ μm. The conventional phase difference detecting range of $\pm 90°$ corresponds to $\pm 2$ μm in terms of focus error at most. Thus, the conventional focus error detecting apparatus is incapable driving an optical disk to a satisfactory extent.

SUMMARY OF THE INVENTION

It is an object of the present invention to provide a phase comparing apparatus capable of detecting a phase difference in the range from $-180°$ to $+180°$ and a focus error detecting apparatus which detects a focus error in a wide dynamic range using the phase comparing apparatus.

In accomplishing these and other objects, there is provided a phase comparing apparatus which outputs a signal of an amplitude corresponding to phase difference between a first signal and a second signal, comprising:

difference signal operating means for outputting a difference signal generated according to the difference in voltage between the first signal and the second signal;

first maximum value detecting means for generating a first maximum value detecting signal when a maximum value of the first signal is detected;

second maximum value detecting means for generating a second maximum value detecting signal when a maximum value of the second signal is detected;

timing comparing means for outputting a first timing signal in response to one of the first and second maximum value detecting signals which is generated earlier than the other of the first and second maximum value detecting signals and outputting a second timing signal in response to the other of the first and second maximum value detecting signals;

first sample-and-hold means for sampling and holding the difference signal outputted from the difference signal operating means, in response to the first timing signal;

second sample-and-hold means for sampling and holding the difference signal outputted from the difference signal operating means, in response to the second timing signal; and differential means for outputting a difference signal generated according to difference in voltage between a signal outputted from the first sample-and-hold means and a signal outputted from the second sample-and-hold means.

According to another aspect of the present invention, a focus error detecting apparatus comprising:

light beam emitting means;

an objective lens for condensing light beams emitted by the light beam emitting means on a recording medium; and light receiving means, having two sections outputting a first and second signals, for detecting light beams which has been reflected by the recording medium and converting the light beams into the signals; and a phase comparing apparatus which outputs a signal of an amplitude corresponding to phase difference between the first signal and the second signal, including:

difference signal operating means for outputting a difference signal generated according to the difference in voltage between the first signal and the second signal;

first maximum value detecting means for generating a first maximum value detecting signal when a maximum value of the first signal is detected;

second maximum value detecting means for generating a second maximum value detecting signal when a maximum value of the second signal is detected;

timing comparing means for outputting a first timing signal in response to one of the first and second maximum value detecting signals which is generated earlier than the other of the first and second maximum value detecting signals and outputting a second timing signal in response to the other of the first and second maximum value detecting signals;

first sample-and-hold means for sampling and holding the difference signal outputted from the difference signal operating means, in response to the first timing signal;

second sample-and-hold means for sampling and holding the difference signal outputted from the difference signal operating means, in response to the second timing signal; and differential means for outputting a difference signal generated according to difference in voltage between a signal outputted from the first sampleand-hold means and a signal outputted from the second sample-and-hold means.

According to the above construction, the absolute value of the phase difference between the first and second signals (Sa and Sb) is detected in as wide as 0° to 180° by finding the difference signal between the first and second signals (Sa and Sb). Then, the timing comparing means detects the sign of the phase difference between the two signals, and then the difference signal is sampled and held in response to the first and second timing signals outputted from the timing comparing means. Thus, the phase difference can be detected in the range from −180° to +180°. Consequently, a focus error can be detected in a wide dynamic range.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
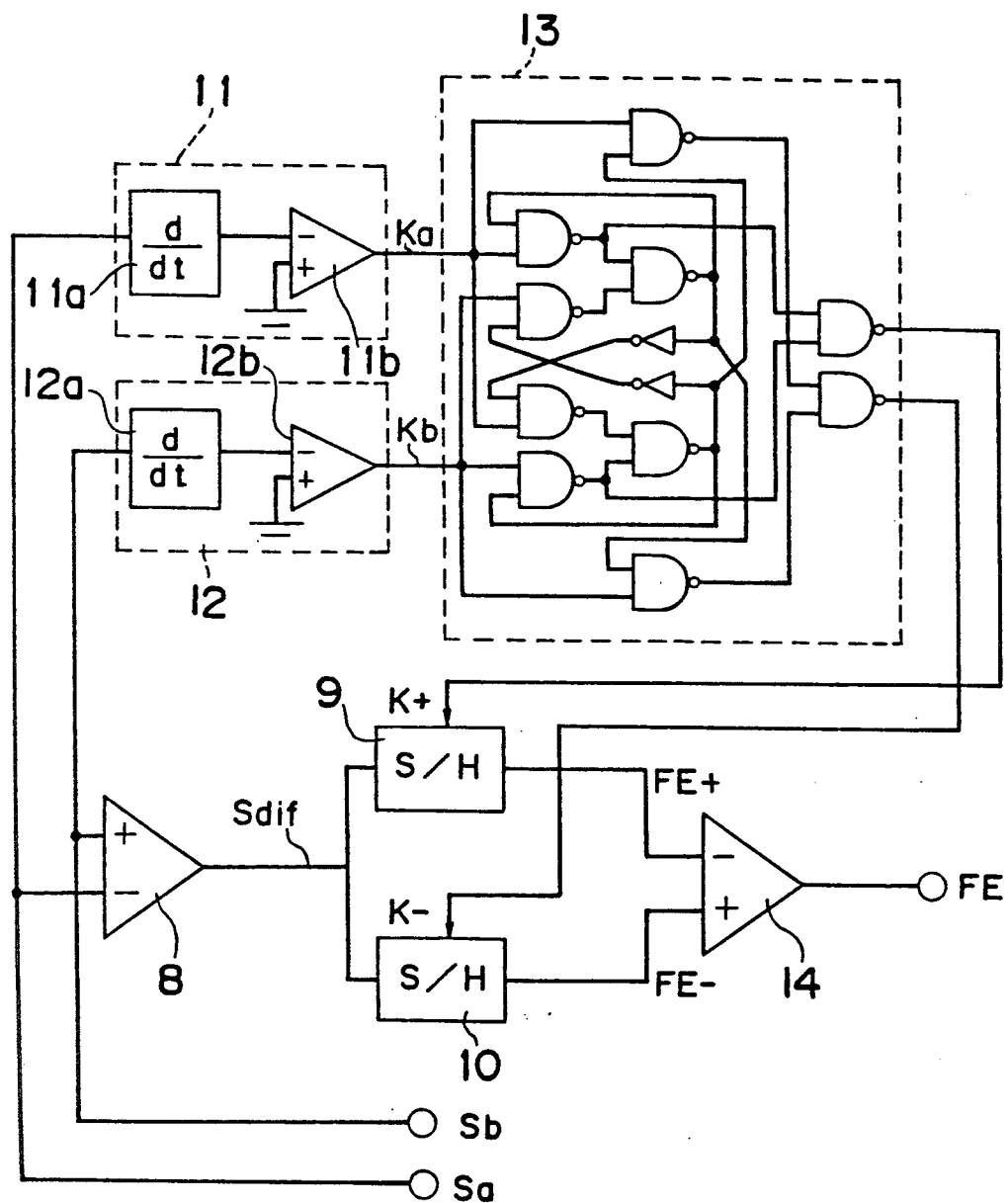
FIG. 1 is a circuit diagram showing the principal portion of a circuit of a focus error detecting apparatus according to an embodiment of the present invention.

Before the description of the present invention proceeds, it is to be noted that like parts are designated by like reference numerals throughout the accompanying drawings.

The embodiments of the present invention will be described with reference to the accompanying drawings.

Figure 2:
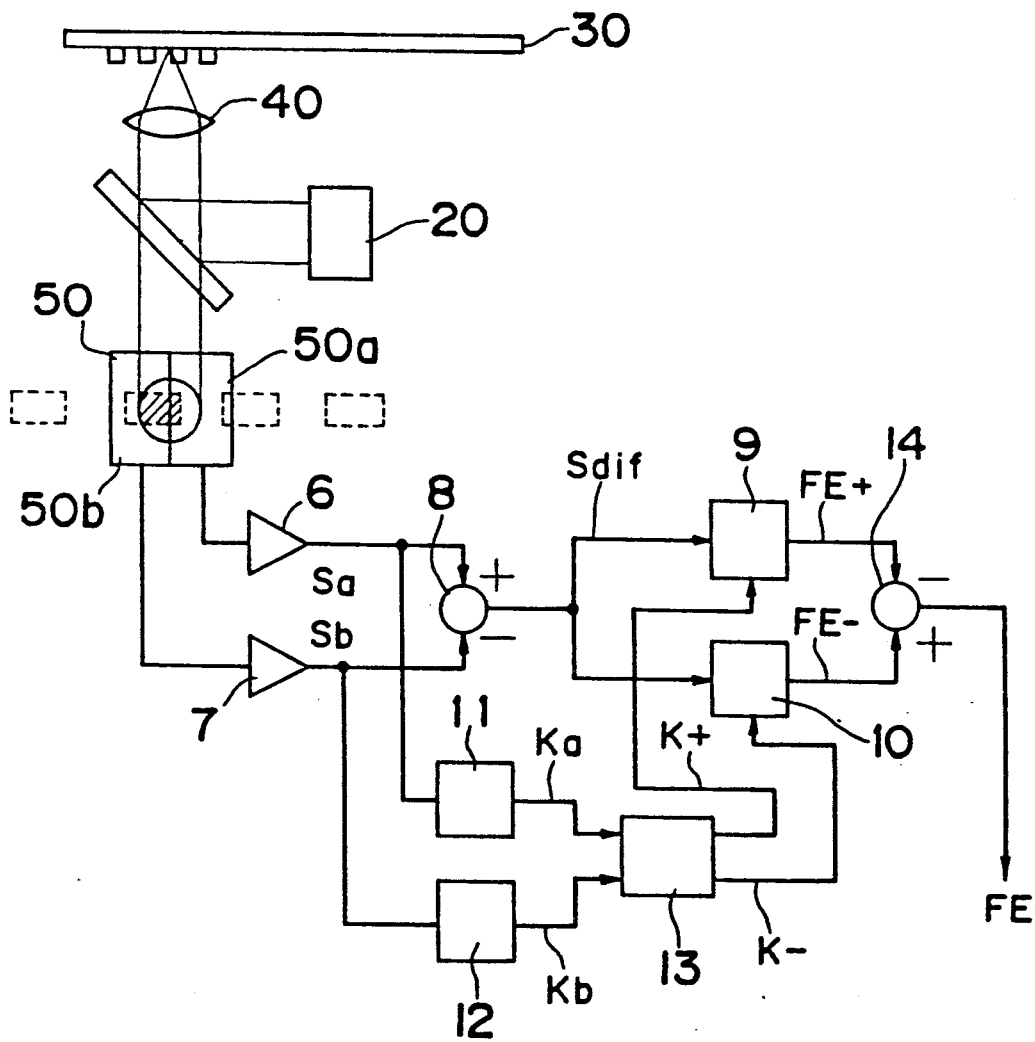
FIG. 2 is a block diagram showing the circuit shown of the focus error detecting apparatus according to the embodiment of the present invention.
Figure 5:
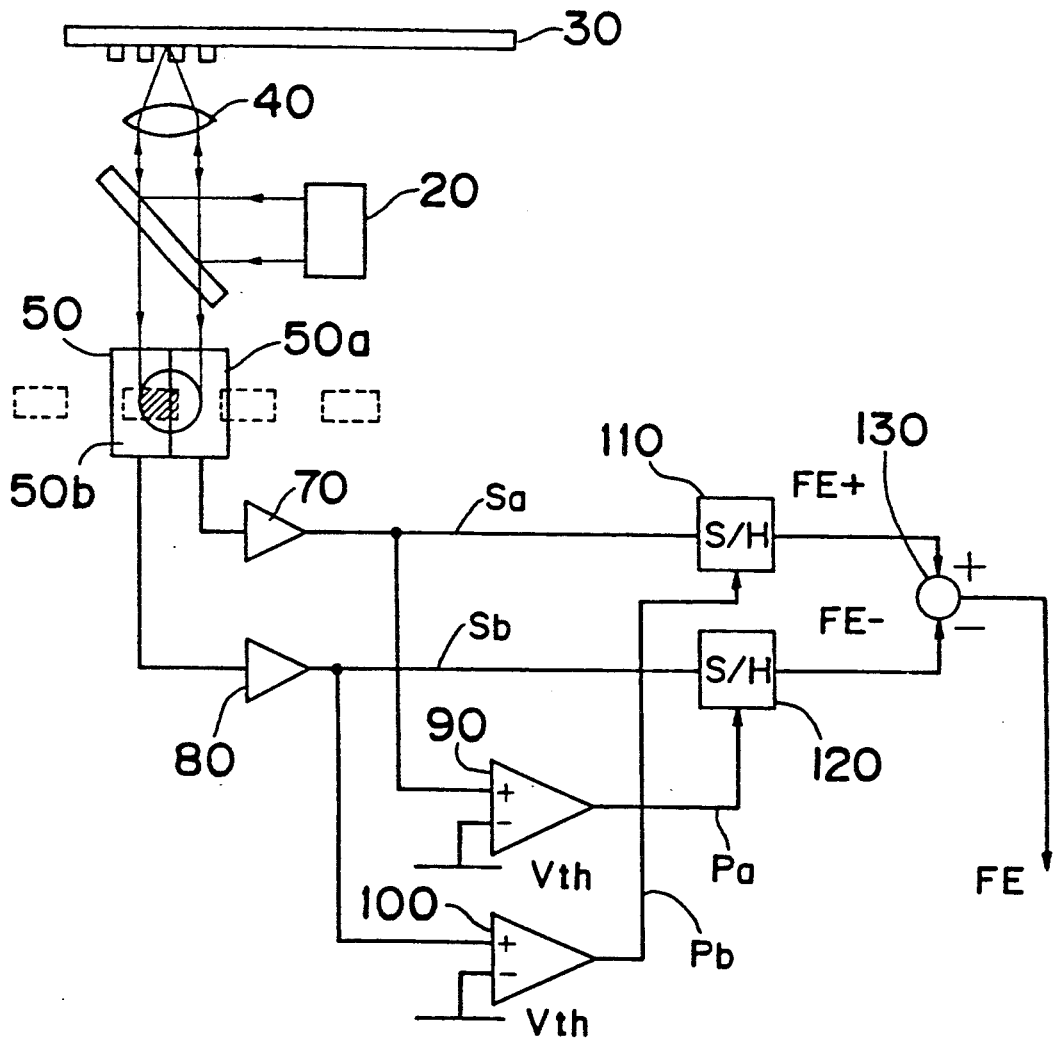
FIG. 5 is a construction view showing a conventional art.
Figure 6:
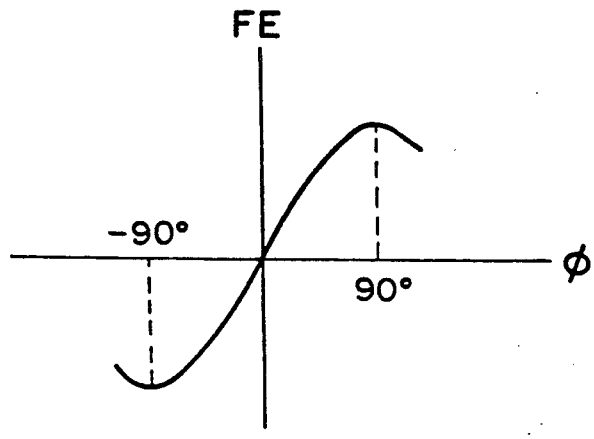
FIG. 6 is a graph showing a focus error signal according to the conventional art.

FIG. 2 is a block diagram showing a focus error detecting apparatus according to a first embodiment of the present invention. FIG. 1 shows the principal portion of the circuit shown in FIG. 2. Referring to FIG. 2, like the above-described conventional art, the apparatus has a laser light source 20 for emitting laser beams, an optical disk 30, an objective lens 40, and a light receiving element 50, which are similar to those of the conventional apparatus shown in FIG. 5. The apparatus of the embodiment further has buffer amplifiers 6 and 7, a differential amplifier 8 serving as difference signal operating means, peak detecting circuits 11 and 12 serving as maximum value detecting means, a timing comparing circuit 13, sample-and-hold circuits 9 and 10, and a differential amplifier 14. The light receiving element 50 has semicircular light receiving sections 50a and 50b similarly to the conventional art described previously. Lights which have diffracted and scattered at the information pit of the optical disk 30 are incident on the light receiving sections 50a and 50b. The buffer amplifiers 6 and 7 amplify electric current outputted from the light receiving sections 50a and 50b into voltage signals Sa and Sb of an appropriate level. The differential amplifier 8 outputs a difference signal generated according to the difference in voltage between the signals Sa and Sb, namely, a signal $S_{dif}$ (=Sa−Sb). The peak detecting circuits 11 and 12 generate pulse signals Ka and Kb which rise at the maximum value of the signals Sa and Sb, respectively. The peak detecting circuits 11 and 12 have, for example, differentiators 11a and 12a and comparators 11b and 12b, respectively. Upon receipt of the pulse signals Ka and Kb, the timing comparing circuit 13 outputs a timing signal K+ when one of the pulse signals Ka and Kb rises and a timing signal K− when the other of the pulse signals Ka and Kb rises. The sample-and-hold circuits 9 and 10 sample and hold a difference signal $S_{dif}$ at the rise of the timing signals K+ and K−, thus outputting signals FE+ and FE−, respectively. The differential amplifier 14 generates a focus error signal FE according to the difference in voltage between the signals FE+ and FE− outputted from the sample-and-hold circuits 9 and 10.

The principle of the focus error detecting apparatus of the above construction is described below by means of equations.

Assuming that the signals Sa and Sb are expressed as follows similarly to the conventional art previously described:

$$Sa = A \sin(\omega t + \phi/2) \tag{8}$$

$$Sb = A \sin(\omega t - \phi/2) \tag{9}$$

The difference signal $S_{dif}$ is expressed as follows:

$$S_{dif} = Sa - Sb = 2A \sin(\phi/2) \cos(\omega t) \tag{10}$$

Timing $t_{ma}$ and $t_{mb}$ of the signals Sa and Sb at maximum values thereof are shown below from equations (8) and (9):

$$t_{ma} = ((2n + \tfrac{1}{2})\pi - \phi/2)/\omega \tag{11}$$

$$t_{mb} = ((2n + \tfrac{1}{2})\pi + \phi/2)/\omega \tag{12}$$

Supposing that the difference signal $S_{dif}$ is sampled and held at this timing, the values of the signals FE+ and FE+ are found by substituting equations (11) and (12) for equation (10):

$$\begin{aligned} FE^+ &= 2A\sin(\phi/2)\cos(\omega t_{ma}) \\ &= 2A\sin(\phi/2)\cos((2n + \tfrac{1}{2})\pi - \phi/2) \end{aligned} \tag{13}$$

$$\begin{aligned} FE^- &= 2A\sin(\phi/2)\cos(\omega t_{mb}) \\ &= 2A\sin(\phi/2)\cos((2n + \tfrac{1}{2})\pi + \phi/2) \end{aligned} \tag{14}$$

Therefore, the focus error signal is shown by the following equation (15) from equations (13) and (14):

$$\begin{aligned} FE &= FE^- - FE^+ = 2A\sin(\phi/2) * (\cos(\omega t_{ma}) - \cos(\omega t_{mb})) \\ &= 4A\sin^2(\phi/2) \end{aligned} \tag{15}$$

As apparent from equation (15), the detection range of the phase difference $\phi$ is as wide as ±180° which is twice as wide as ±90°. Since equation (15) is an even function of the phase difference $\phi$, the polarity of the phase difference $\phi$ cannot be detected although the absolute value of the focus error can be detected. Accordingly, it is necessary to discriminate the polarity of φ so as to invert the output of the sample-and-hold circuit from a positive value to a negative value or vice versa. To this end, the sample holding timing is reversed. That is, $$\text{when } \phi \geq 0, \quad t^+ = t_{ma} \tag{16}$$
$$t^- = t_{mb}$$

$$\text{when } \phi < 0, \quad t^+ = t_{mb} \tag{17}$$
$$t^- = t_{ma}$$

Then, equation (15) is expressed as follows:

$$FE = FE^- - FE^+ = 2A\sin(\phi/2) \cdot (\cos(\omega t^+) - \cos(\omega t^-)) \tag{18}$$
$$= \text{sgn}(\phi) 4A\sin^2(\phi/2)$$

sgn(φ) is a function shown below:

$$\text{sgn}(\phi) = +1 : \phi \geq 0$$
$$= -1 : \phi < 0$$

Figure 3:
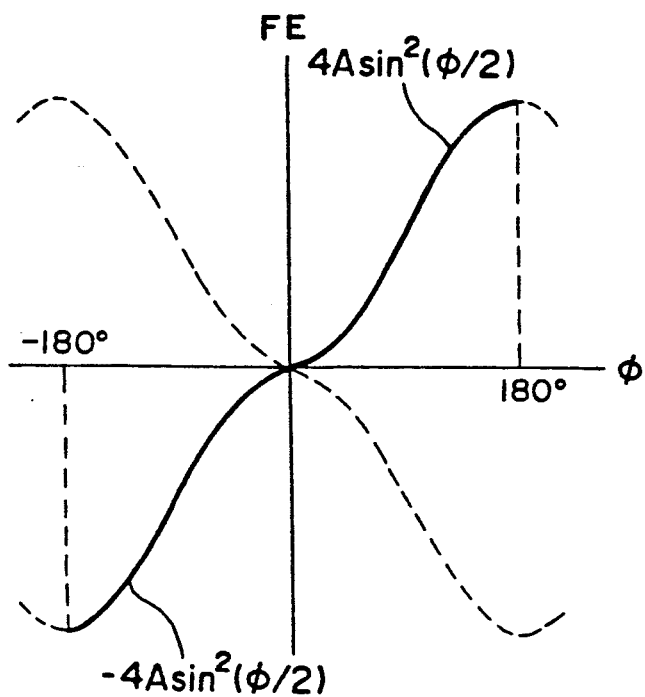
FIG. 3 is a graph showing the effect of the embodiment of the present invention.

FIG. 3 shows equation (18) calculated in the range of $-180° < \phi < +180°$. In FIG. 3, the abscissa is the phase difference φ and the ordinate is the signal FE. The curves in FIG. 3 show $4A\sin^2(\phi/2)$ and $-4A\sin^2(\phi/2)$. The solid line is the focus error signal FE indicated by equation (18).

The operation of the circuit shown in FIGS. 1 and 2 is described with reference to equations (8) through (18).

The operation expressed by equation (10) is performed by the differential amplifier 8. The operation expressed by equations (11) and (12) is executed by the peak detecting circuits 11 and 12. The signal Sa is differentiated by the differentiator 11a. Since the differentiated value of the signal Sa at peaks (maximum and minimum values) is zero, the comparator 11b finds values crossing the differentiated signal and zero set as the threshold. As a result, the pulse signal Ka is generated with the maximum value corresponding to the leading edge and the minimum value corresponding to the trailing edge. Similarly, the pulse signal Kb is generated from the signal Sb by the operation of differentiator 12a and the comparator 12a. The rise timing of the pulse signals Ka and Kb correspond to $t_{ma}$ of equation (11) and $t_{mb}$ of equation (12), respectively.

Figure 4:
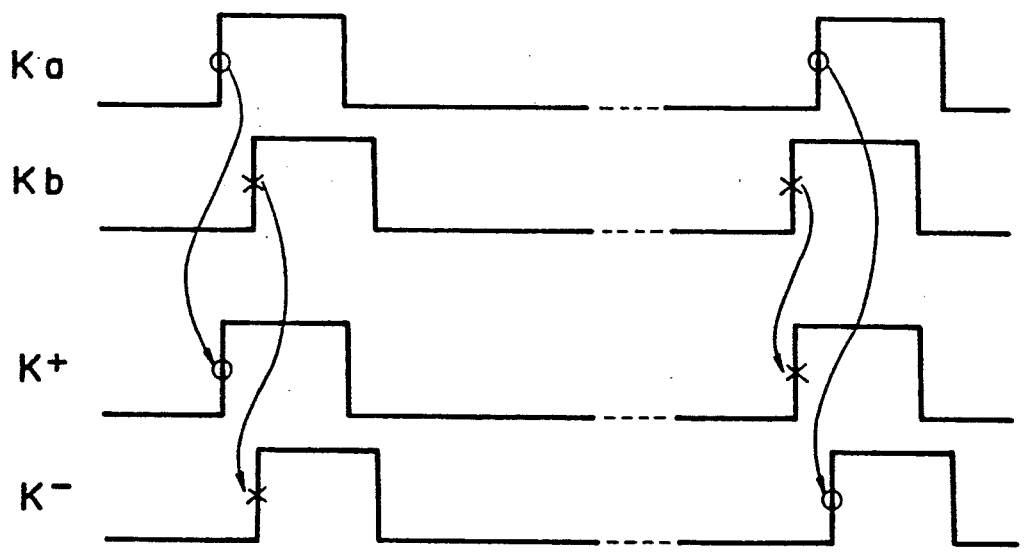
FIG. 4 is a timing chart showing the operation of the embodiment of the present invention.

The timing comparing circuit 13 reverses the sample holding time described in equations (16) and (17). The timing comparing circuit 13 shown in FIG. 1 is, for example, a sequential logical circuit including NAND gates, and the timing chart thereof is as shown in FIG. 4. The rise timing of the timing signals K+ and K− outputted from the timing comparing circuit 13 corresponds to t+ of equation (16) and t− of equation (17) respectively. The sample-and-hold circuits 9 and 10 sample and hold the difference signal $S_{dif}$ at the timing of t+ and t− to generate FE+ and FE− respectively, and then, the differential amplifier 14 takes the difference in voltage between FE+ and FE− to generate the signal FE. Thus, the operation shown in equation (18) is performed.

As described above, it is possible to detect a phase in the range from $-180°$ to $+180°$. Thus, the focus error detecting apparatus has a wide dynamic range.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A phase comparing apparatus which outputs a signal of an amplitude corresponding to phase difference between a first signal and a second signal, comprising:

difference signal operating means for outputting a difference signal generated according to the difference in voltage between the first signal and the second signal;

first maximum value detecting means for generating a first maximum value detecting signal when a maximum value of the first signal is detected;

second maximum value detecting means for generating a second maximum value detecting signal when a maximum value of the second signal is detected;

timing comparing means for outputting a first timing signal in response to one of the first and second maximum value detecting signals which is generated earlier than the other of the first and second maximum value detecting signals and outputting a second timing signal in response to the other of the first and second maximum value detecting signals;

first sample-and-hold means for sampling and holding the difference signal outputted from the difference signal operating means, in response to the first timing signal;

second sample-and-hold means for sampling and holding the difference signal outputted from the difference signal operating means, in response to the second timing signal; and differential means for outputting a difference signal generated according to difference in voltage between a signal outputted from the first sample-and-hold means and a signal outputted from the second sample-and-hold means.

2. A focus error detecting apparatus comprising:
light beam emitting means;
an objective lens for condensing light beams emitted by the light beam emitting means on a recording medium; and
light receiving means, having two sections outputting a first and second signals, for detecting light beams which has been reflected by the recording medium and converting the light beams into the signals; and
a phase comparing apparatus which outputs a signal of an amplitude corresponding to phase difference between the first signal and the second signal, including:

difference signal operating means for outputting a difference signal generated according to the difference in voltage between the first signal and the second signal;

first maximum value detecting means for generating a first maximum value detecting signal when a maximum value of the first signal is detected;

second maximum value detecting means for generating a second maximum value detecting signal when a maximum value of the second signal is detected;

timing comparing means for outputting a first timing signal in response to one of the first and second maximum value detecting signals which is generated earlier than the other of the first and second maximum value detecting signals and outputting a second timing signal in response to the other of the first and second maximum value detecting signals;

first sample-and-hold means for sampling and holding the difference signal outputted from the difference signal operating means, in response to the first timing signal;

second sample-and-hold means for sampling and holding the difference signal outputted from the difference signal operating means, in response to the second timing signal; and differential means for outputting a difference signal generated according to difference in voltage between a signal outputted from the first sample-and-hold means and a signal outputted from the second sample-and-hold means.

* * * * *